United States Patent
Gu et al.

(10) Patent No.: US 10,404,065 B2
(45) Date of Patent: Sep. 3, 2019

(54) DISTRIBUTED PREDICTIVE CONTROL BASED VOLTAGE RESTORATION SCHEME FOR MICROGRIDS

(71) Applicant: SOUTHEAST UNIVERSITY, Nanjing (CN)

(72) Inventors: Wei Gu, Nanjing (CN); Guannan Lou, Nanjing (CN); Ming Chen, Nanjing (CN); Wei Liu, Nanjing (CN); Shuai Xue, Nanjing (CN); Ge Cao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 138 days.

(21) Appl. No.: 15/552,189

(22) PCT Filed: Dec. 16, 2016

(86) PCT No.: PCT/CN2016/110483
§ 371 (c)(1),
(2) Date: Aug. 18, 2017

(87) PCT Pub. No.: WO2017/152682
PCT Pub. Date: Sep. 14, 2017

(65) Prior Publication Data
US 2018/0138705 A1    May 17, 2018

(30) Foreign Application Priority Data
Mar. 10, 2016 (CN) .......................... 2016 1 0135626

(51) Int. Cl.
*H02J 3/12* (2006.01)
*H02J 3/18* (2006.01)
(Continued)

(52) U.S. Cl.
CPC .................... *H02J 3/12* (2013.01); *H02J 3/14* (2013.01); *H02J 3/18* (2013.01); *H02J 3/381* (2013.01); *H02J 3/40* (2013.01); *H02J 2003/388* (2013.01)

(58) Field of Classification Search
CPC ...... H02J 3/12; H02J 3/14; H02J 3/381; H02J 3/18; H02J 2003/388; H02J 3/40
See application file for complete search history.

(56) References Cited

FOREIGN PATENT DOCUMENTS

| CN | 102842904 A | 12/2012 |
|---|---|---|
| CN | 104578182 A | 4/2015 |

(Continued)

*Primary Examiner* — Carlos R Ortiz Rodriguez
(74) *Attorney, Agent, or Firm* — CBM Patent Consulting, LLC

(57) ABSTRACT

A distributed predictive control based voltage restoration scheme for microgrids, comprising: step 10) adopting a distributed finite time observer to acquire the global reference voltage for restoring the voltage of each local controller; step 20) each local controller adopts a droop control to acquire the local voltage value of each generation, and adds a secondary voltage compensation term into the droop characteristic formula to form the voltage reference value of a distributed generation; step 30) establishing a trended prediction model; step 40) acquiring a predictive control term at a current time as the secondary voltage compensation command, and acting on the local controllers; and step 50) determining, whether the local voltage of each distributed generation of the microgrid reaches the voltage reference value under the secondary voltage compensation command.

3 Claims, 7 Drawing Sheets

(51) Int. Cl.
    *H02J 3/38*    (2006.01)
    *H02J 3/14*    (2006.01)
    *H02J 3/40*    (2006.01)

(56)　　　　References Cited

FOREIGN PATENT DOCUMENTS

CN　　　104779607 A　　7/2015
CN　　　105322532 A　　2/2016

DISTRIBUTED PREDICTIVE CONTROL BASED VOLTAGE RESTORATION SCHEME FOR MICROGRIDS

This application is the U.S. national phase of International Application No. PCT/CN2016/110483 filed on 16 Dec. 2016 which designated the U.S. and claims priority to Chinese Application Nos. CN201610135626.2 filed on 10 Mar. 2016, the entire contents of each of which are hereby incorporated by reference.

TECHNICAL FIELD

The present invention relates to the operation and control of a microgrid, in particular to a distributed predictive control based voltage restoration scheme for microgrids.

BACKGROUND

With the gradual exhaustion of resources on the earth and the incensement of serious environmental problems, more and more attentions are drawn to the utilization of renewable energies around the world. Microgrid has emerged as an energy integration to improve the penetration of renewable energy resources and distributed energy resources in an energy supply system. Each microgrid consists of different types of distributed energy resources (DGs) which comprise micro-turbines, wind generators, photovoltaics, fuel cells, energy storages as well as load and protection devices.

Microgrids are integrated to a synchronization AC grid via power-electronic converters, typically inverters; they exchange power with the main grid via the point of common coupling, improving the reliability of power supplies. Since the microgrid is a distributed system of small scale, and closes to loads, which can enhance the system security, reduce the grid losses and greatly increases the energy utilization efficiency, it is a promising generation mode satisfying the development of smart grid in the future. Under normal conditions, the microgrid is connected to the main grid which provides voltage and frequency references. The most attractive advantage of microgrid is to island itself from the main grid irrespective of planned or spontaneous events. The peer-to-peer control mode adopting a droop control does not require a dominant distributed generation and communication links, and thus draws wide attention. When the microgrid is required to transfer from a grid-connected mode to an islanded mode, the distributed generations can automatically share the active power and reactive power in the microgrid. However, the droop control is a proportional discriminatory control, and will cause voltage deviation from the reference value, which results to secondary voltage control. At present, voltage restoration is implemented in the centralized control scheme and the multi-agent-based distributed control. The centralized control scheme is based on a central controller, requires a complex communication network, and suffers from huge data-handling. Furthermore, the single-point failure and distributed feature of the renewable energy may both result in the change of the communication topology, which further challenge the reliability of the central controller. On the contrary, the multi-agent-based distributed control scheme only exchanges information with its immediate neighbors, realizes efficient information sharing, and finally achieves quicker decision making and operation with a simple communication structure.

SUMMARY OF THE INVENTION

Technical Problem: the technical problem to be solved by the present invention is: providing a distributed predictive control based voltage restoration scheme for microgrids. The control scheme is a completely distributed scheme, realizes the global information, adopts predictive control to acquire a secondary voltage compensation command, and can restore the voltage of each distributed generation in a microgrid. Therefore, the present invention can quickly restore the distributed voltage to the reference value, and improve the overall power quality of a microgrid.

Technical Scheme: to solve the technical problem mentioned above, the embodiment of the present invention adopts a distributed predictive control based voltage restoration scheme for microgrids, comprising the following steps:

Step 10) Suppose that there are N distributed generations in an autonomous microgrid, where the distributed control structure is adopted. The microgrid voltage reference instruction is entered through a human-machine interface and sent out to a part of pinned distributed generations via the 485 communication mode. A distributed finite time observer is utilized to acquire the global reference voltage as the reference for restoring the local voltage of each distributed generation;

Step 20) The data acquisition module of each distributed generation collects the voltage from the local sensor, that is to be sent to the respective DSP. Each local controller adopts the droop control and a secondary voltage compensation term is added to the droop characteristic formula, wherein the local voltage reference value of each distributed generation can be represented as formula (1):

$$v_i = v_0 - n_{Qi} Q_i + u_i^V \quad \text{Formula (1)}$$

Wherein $v_i$, denotes the local voltage value of the i-th distributed generation in the microgrid; $v_0$ denotes the voltage reference value, unit: kilovolt; $n_{Qi}$ denotes the voltage droop characteristic coefficient of the i-th distributed generation in the microgrid, unit: kilovolt/megavar; $Q_i$ denotes the reactive power of the i-th distributed generation in the microgrid, unit: megavar; and $u_i^V$ denotes the secondary voltage compensation term, unit kilovolt;

The information exchange is implemented through the communication ports of the DSP of individual distributed generation with the information update interval $\varepsilon$. According to formula (1), the dynamic characteristics of each distribute generation is transformed into a discrete form:

$$v(k+1) = Pv(k) + E_r \quad \text{Formula (2)}$$

Wherein k is the current time; k+1 is the next time; $v(k) = [v_1(k), \ldots, v_N(k)]^T$, $v_1(k)$ denotes the voltage value of the first distributed generation at t=k, and $v_N(k)$ denotes the voltage value of the N-th distributed generation at t=k; v(k+1) denotes the matrix formed by the voltage values of the distributed generations at t=k+1; $P = I_N(1-\varepsilon) - \varepsilon L$, $I_N$ denotes the n-order unit matrix, and L denotes the Laplacian matrix of the distributed structure of the microgrid, which represents the information exchange between the distributed generations; $E_r = \varepsilon v_{ref} E_N$, $v_{ref}$ denotes the reference voltage value of the microgrid, and $E_N$ denotes the unit column vector of N elements, $E_N = 1N$;

Add a prediction term with an adjustable parameter to the formula (2), as represented by formula (3):

$$v(k+1) = Pv(k) + E_r + u(k)$$

$$u(k) = -\mu[Lv(k) + (v(k) - v_{ref} E_N)] \quad \text{Formula (3)}$$

Wherein u(k) denotes the prediction term with an adjustable parameter, $u(k) = [u_1(k), \ldots, u_N(k)]^T$, $u_1(k)$ denotes the prediction term of the first distributed generation; $u_N(k)$ denotes the prediction term of the N-th distributed generation; the superscript T denotes transposition; and μ denotes the coefficient of the prediction term with an adjustable parameter;

According to the formulas (1) and (3), the secondary control compensation term is represented as formula (4):

$$u_i^V(k)=[0,\ldots,1_{ith},\ldots 0][\varepsilon(L-I_N)v(k)+E_r+u(k)]$$  Formula (4)

Wherein $[0,\ldots,1_{ith},\ldots 0]$ represents a row vector comprising N elements, with the i-th element as 1, and the other elements 0;

Step 30) Expand the formula (3) into a trended prediction model with $H_P$ prediction horizons and $H_U$ control horizon.

$$V(k+1)=Av(k)+BU(k)+E_r$$

$$U(k)=-FLv(k)+M$$  Formula (5)

Wherein $V(k+1)=[(k+1),\ldots,v^T(k+H_P)]^T$, $v(k+1)$ denotes the matrix formed by the voltage values of the distributed generations at $t=k+1$, and $v(k+H_P)$ denotes the matrix formed by the voltage values of the distributed generations at $t=k+H_P$; $U(k)=[u^T(k),\ldots,u^T(k+H_u-1)]^T$, $u(k)$ denotes the matrix formed by the first prediction terms of the distributed generations, and $u(k+H_u-1)$ denotes the matrix formed by the $H_u$-th prediction terms of the distributed generations;

$$A = \begin{bmatrix} P \\ \vdots \\ P^{H_P} \end{bmatrix}_{H_U N \times N},$$

$$B = \begin{bmatrix} I_N & & & & \\ P & I_N & & & \\ \vdots & \vdots & \ddots & & \\ P^{H_U-1} & P^{H_U-2} & \ldots & I_N & \\ P^{H_U} & P^{H_U-1} & \ldots & P+I_N & \\ \vdots & \vdots & \vdots & \vdots & \\ P^{H_P-1} & P^{H_P-2} & \ldots & P^{H_P-H_U}+\ldots+I_N \end{bmatrix}_{H_P N \times H_U N}$$

$E_r = E_r$, $B \in R^{H_P N \times 1}$, R denotes the real number matrix;

$$F = \begin{bmatrix} -\mu(L+I_N) \\ -\mu(L+I_N)(P-\mu(L+I_N)) \\ \vdots \\ -\mu(L+I_N)(P-\mu(L+I_N))^{H_U-1} \end{bmatrix}_{H_U N \times N}$$

$$M = \begin{bmatrix} \mu v_{ref} E_N \\ -\mu(L+I_N)H + \mu v_{ref} E_N \\ \ldots \\ -\mu(L+I_N)(H^{H_u-1}+\ldots+H)+\mu v_{ref} E_N \end{bmatrix}_{H_U N \times 1}$$

$H = E_r + \mu v_{ref} E_N \in R^{N \times 1}$;

Step 40) Suppose that in the $H_P$ prediction horizons, the voltage differences of the distributed generations are represented as formula (7):

$$\Delta V(k+1) = [\Delta v(k+1)^T,\ldots \Delta v(k+H_P)^T]^T$$  Formula (7)

$$= \Psi V(k+1) = \Psi(Av(k)+BU(k)+E_r)$$

$$= A_\Psi v(k) + B_\Psi U(k) + \Psi E_r \in R^{H_P N \times 1}$$

Wherein $\Delta V(k+1)$ denotes the voltage difference matrix of the distributed generations in the time period from $k+1$ to $k+H_P$; $\Delta v(k+1)$ denotes the voltage difference matrix of the distributed generations at $t=k+1$; $\Delta v(k+1)=[v_1(k+1)-v_2(k+1),\ldots,v_{N-1}(k+1)-v_N(k+1)]$, $v_1(k+1)$ denotes the voltage difference of the first distributed generation at $t=k+1$; $v_2(k+1)$ denotes the voltage difference of the second distributed generation at $t=k+1$; $v_{N-1}(k+1)$ denotes the voltage difference of the (N−1)-th distributed generation at $t=k+1$; $v_N(k+1)$ denotes the voltage difference of the N-th distributed generation at $t=k+1$; $\Delta v(k+H_P)$ denotes the voltage difference matrix of the distributed generations at $t=k+H_P$; $\Delta v(k+H_P)=[v_1(k+H_P)-v_2(k+H_P),\ldots,v_{N-1}(k+H_P)-v_N(k+H_P)]$, $v_1(k+H_P)$ denotes the voltage difference of the first distributed generation at $t=k+H_P$; $v_2(k+H_P)$ denotes the voltage difference of the second distributed generation at $t=k+H_P$; $v_{N-1}(k+H_P)$ denotes the voltage difference of the (N−1)-th distributed generation at $t=k+H_P$; $v_N(k+H_P)$ denotes the voltage difference of the N-th distributed generation at $t=k+H_P$; $A_\Psi=\Psi A$, $B_\Psi=\Psi B$, $\Psi=\mathrm{diag}(L,\ldots,L)\in R^{H_P N \times H_P N}$;

According to the formula (7), the coefficient μ of the prediction term with an adjustable parameter is evaluated to minimize an optimization index function defined by formula (8), where the positive definite symmetric matrices Q, W and R are weighting matrices;

$$J(k)=\|\Delta V(k+1)\|_Q^2+\|V(k+1)-\xi I_{NH_P}\|_W^2+\|U(k)\|_R^2$$  Formula (8)

Wherein $J(k)$ denotes the optimization index function; and ξ denotes the reference voltage value of each distributed generation;

Substitute the calculated coefficient μ of the prediction term with an adjustable parameter into the formula (5) to acquire the predictive control term of $H_U$ horizons for each distributed generation, where the current predictive control term is derived as a secondary voltage compensation instruction. Then, the secondary voltage compensation instruction is transmitted to the PWM module of the local controller; and the generated PWM pulse signal is transmitted to the drive and power amplifier unit to trigger the power electronic switching transistor.

Step 50) Determine whether the local voltage of each distributed generation in the microgrid reaches the voltage reference value under the secondary voltage compensation item acquired in step 40), if yes, then complete the control process; if no, then re-acquire the local voltage value of each distributed generation as the current voltage value, and repeat steps 20)-40) until the local voltage values all restore to the voltage reference value.

As a preferred embodiment, in step 10), the distributed finite time observer is represented as formula (9):

$$\hat{v}_i = sig\left[\sum_{j=1}^{N} a_{ij}(\hat{v}_j - \hat{v}_i) + g_i(v_{ref} - \hat{v}_i)\right]^{1/2}$$  Formula (9)

Wherein $\hat{v}_i$ denotes the output value of a local observer of the i-th distributed generation, and represents the observation to the global reference information; $\dot{\hat{v}}_i$ denotes the differential form of $\hat{v}_i$; $a_{ij}$ denotes the neighboring weight; $a_{ij}>0$ denotes that the i-th distributed generation is directly connected to the j-th distributed generation; $a_{ij}=0$ denotes that the i-th distributed generation is not connected to the j-th distributed generation; $\hat{v}_j$ denotes the output value of the local observer of the j-th distributed generation; $g_i$ denotes if the i-th distributed generation is a pinned generation, $g_i=1$ denotes that the pinned distributed generation can directly acquire the reference value, otherwise $g_i=0$.

As a preferred embodiment, in step 40), $Q=qI_N$, $W=wI_N$, $R=rI_N$, q denotes the first coefficient; w denotes the second coefficient; r denotes the third coefficient; q, w and r are all greater than 0.

Beneficial effects: Compared with the prior art, the present invention has the following beneficial effects: the control scheme in the embodiment of the present invention is a completely distributed control scheme, and avoids the complex communication structure and the huge data handling in a centralized control scheme. To solve the voltage deviation due to the droop primary control, the embodiment of the present invention converts the microgrid secondary voltage restoration problem into a tracker consensus problem based on distributed predictive control, such that the local voltage of each distributed generation can be globally shared, and can quickly and synchronously track the reference value, thus improving the voltage quality of a microgrid. The scheme for restoring microgrid voltage of the present invention acquires the local voltage of each distributed generation via the local agent, establishes a predictive control model comprising a predication term with an adjustable parameter, and expands the predictive control model to a trended prediction model based on $H_P$ prediction horizons and $H_U$ control horizons. After allocating different weights among the three control targets according to a preset penalty target function to the trended prediction model, the objective of quick voltage restoration among different distributed generations is realized. Acquire the latest secondary compensation term according to the evaluated adjustable prediction coefficient, and implement it on the local controllers. Repeat the steps above until the local voltage values all restore to the reference value. On the condition that not all the distributed generations in a microgrid can acquire the reference value, the global information can be quickly shared by the finite time observer in the embodiment of the present invention. The acquired secondary voltage restoration command comprises prediction information and the results of rolling optimization. Therefore, the present invention has a good adaptability to model uncertainty such as power fluctuations of distributed generations and loads, and plug-and-play of distributed generations. In the embodiment of the present invention, the proposed approach is robust against different information updating rates in the voltage restoration, thus improving the control performance of an islanded microgrid.

BRIEF DESCRIPTION OF THE DRAWINGS

FIG. 8 (b) is a voltage restoration diagram of the conventional secondary control under the circumstances of load attached to or detached from the microgrid;

FIG. 10 (b) is the voltage restoration diagram of the conventional secondary control at different information updating intervals.

DETAILED DESCRIPTION OF THE INVENTION

In order to enable the objectives, technical schemes and advantages of the present invention to be more apparent, the present invention will be described in more details with the aid of the attached drawing and implementation cases. It should be understood that the specific embodiments described herein are only for illustrating but not for limiting the present invention.

Figure 1:
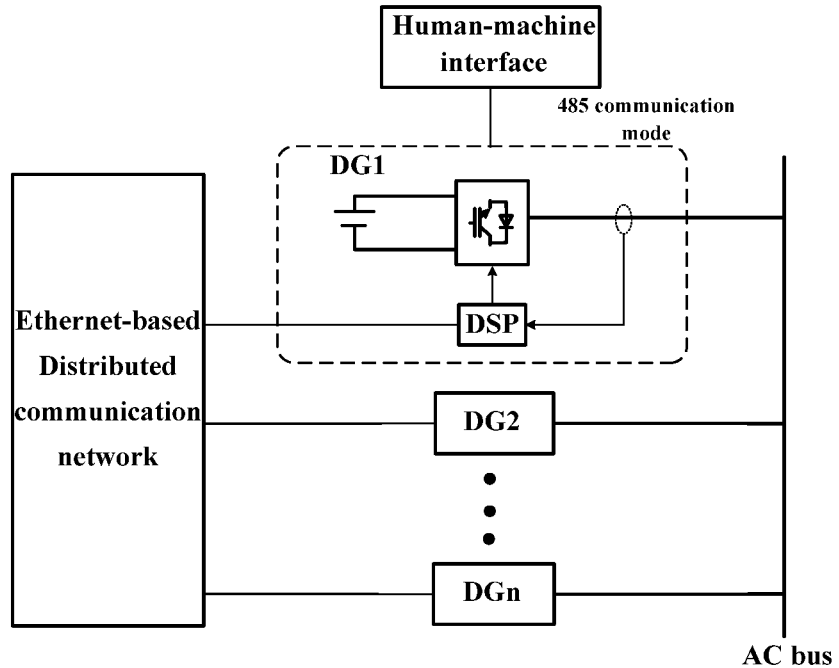
FIG. 1 is a structural diagram of parallel inverter microgrid of the present invention, DSP represents Digital Signal Processing.
Figure 2:
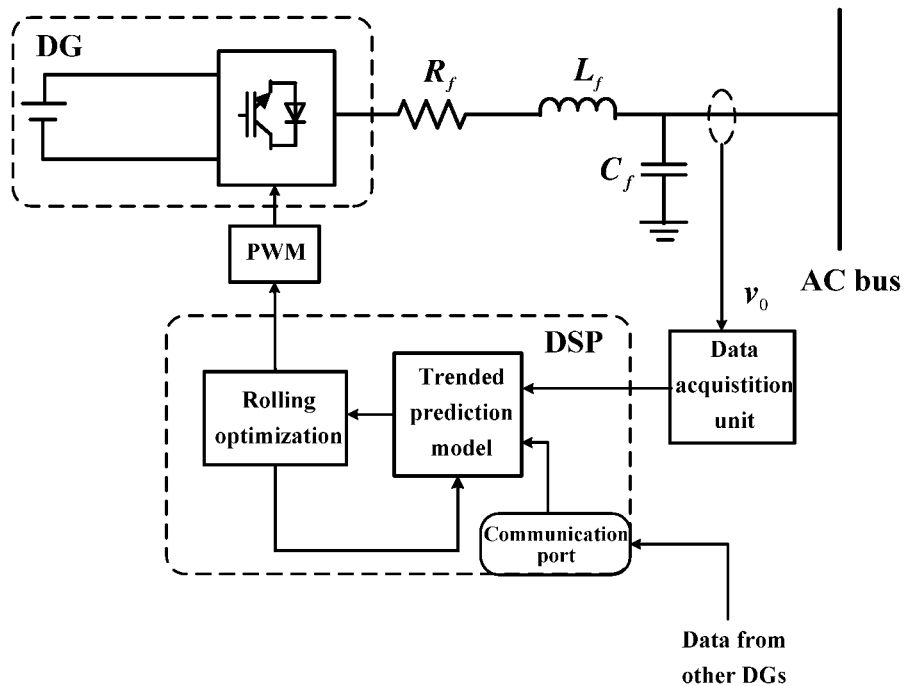
FIG. 2 is a detailed hardware implementation diagram of the present invention; PWM represents Pulse Width Modulation.
Figure 3:
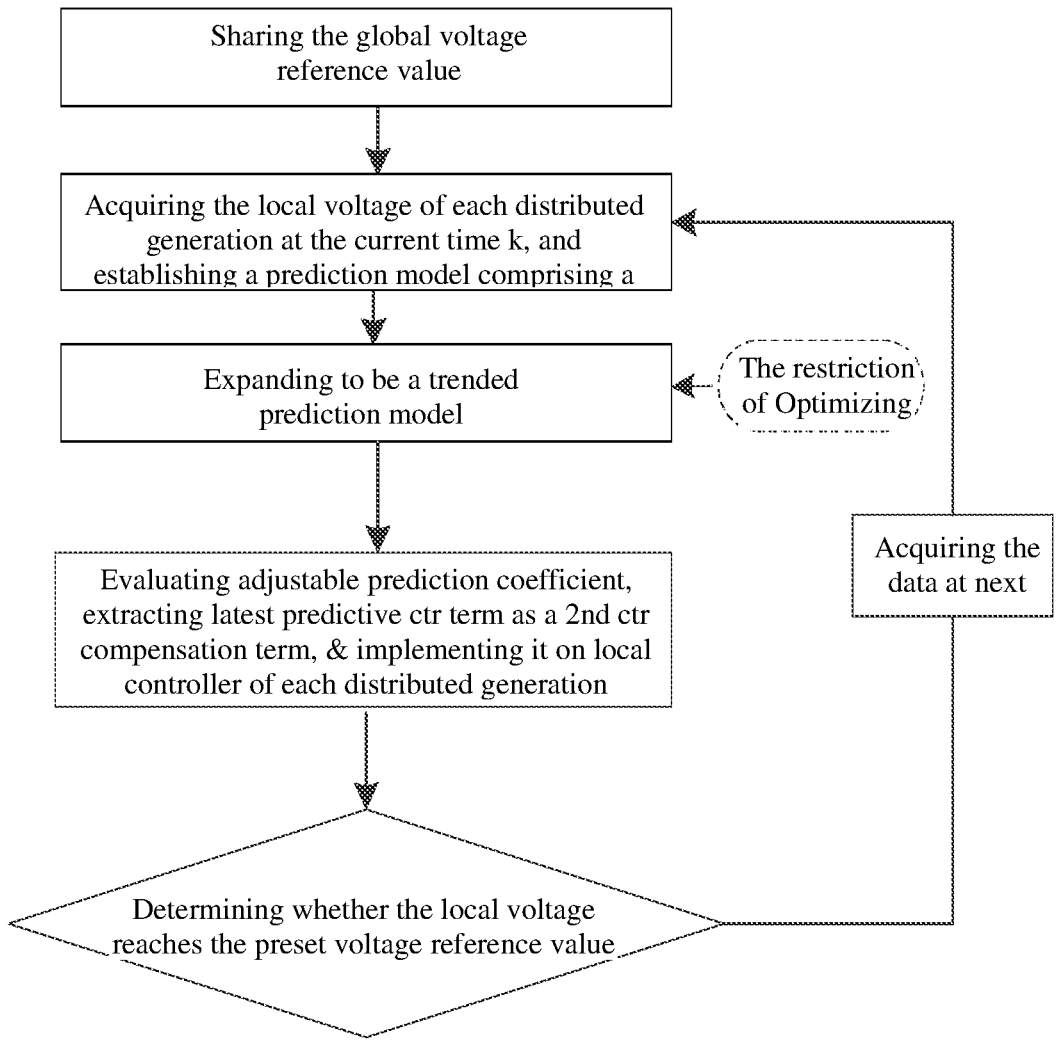
FIG. 3 is a flow diagram of the embodiment of the present invention.

The control method of the present invention can be applied to a parallel inverter microgrid. As shown in FIG. 1, the microgrid voltage reference instruction is entered through a human-machine interface and sent to the pinned distributed generations via the 485 communication mode. The distributed generations perform information exchange by the Ethernet-based distributed communication network and the diagram of specific signal control and hardware implementation is as shown in FIG. 2. The data acquisition unit of each distributed generation collects the voltage from the local sensor. By combining the local voltage and the voltages from other distributed generations, a secondary voltage compensation instruction is generated by utilizing the distributed predictive control based voltage restoration scheme of the present invention, and is then transmitted to the PWM module of the local controller to trigger the inverter operation. As shown in FIG. 3, the distributed predictive control based voltage restoration scheme for microgrids comprises the following steps:

Step 10) Suppose that there are N distributed generations in an autonomous microgrid, where the distributed control structure is adopted. The microgrid voltage reference instruction is entered through a human-machine interface and sent out to a part of pinned distributed generations via the 485 communication mode. A distributed finite time observer is utilized to acquire the global reference voltage as the reference for restoring the local voltage of each distributed generation, wherein the pinned distributed generations refer to the distributed generations which can directly receive the voltage reference information from an external set.

In step 10), the distributed finite time observer is represented as formula (9):

$$\hat{v}_i = sig\left[\sum_{j=1}^{N} a_{ij}(\hat{v}_j - \hat{v}_i) + g_i(v_{ref} - \hat{v}_i)\right]^{1/2} \quad \text{Formula (9)}$$

Wherein $\hat{v}_i$ denotes the output value of a local observer of the i-th distributed generation, and represents the observation to the global reference information; $\dot{\hat{v}}_i$ denotes the differential form of $\hat{v}_i$; $a_{ij}$ denotes the neighboring weight; $a_{ij}>0$ denotes that the i-th distributed generation is directly connected to the j-th distributed generation; $a_{ij}=0$ denotes that the i-th distributed generation is not connected to the j-th distributed generation; $\hat{v}_j$ denotes the output value of a local observer of the j-th distributed generation; $g_i$ denotes that the i-th distributed generation is a pinned generation; $g_i=1$ denotes that the pinned distributed generation can directly acquire the reference value, otherwise $g_i=0 \cdot Sig(*)^a = sign(*)|*|^a$ ($a>0$) denotes the finite time function. According to the formula (9), each local voltage observer reaches $\hat{v}_i = v_{ref}$ when $t \geq T_0$. The observer is mainly used for a distributed structure, and certain distributed generations can not directly acquire the voltage reference value, thus facilitating the distributed sharing of the global information.

Step 20) The data acquisition module of each distributed generation collects the voltage from the local sensor, that is to be sent to the respective DSP. Each local controller adopts the droop control and a secondary voltage compensation term is added to the droop characteristic formula, wherein the local voltage reference value of each distributed generation can be represented as formula (1):

$$v_i = v_0 - n_{Qi}Q_i + u_i^V \quad \text{Formula (1)}$$

Wherein $v_i$ denotes the local voltage value of the i-th distributed generation in the microgrid; $v_0$ denotes the voltage reference value, unit: kilovolt; $n_{Qi}$ denotes the voltage droop characteristic coefficient of the i-th distributed generation in the microgrid, unit: kilovolt/megavar; $Q_i$ denotes the reactive power of the i-th distributed generation in the microgrid, unit: megavar; and $u_i^V$ denotes the secondary voltage compensation term, unit kilovolt.

The information exchange is implemented through the communication ports of the DSP of the individual distributed generation with the information update interval ε. According to formula (1), the dynamic characteristics of each distribute generation is transformed into a discrete form. Therefore, the microgrid secondary voltage restoration problem is transformed into a distributed prediction synchronous tracking problem.

$$v(k+1) = Pv(k) + E_r \quad \text{Formula (2)}$$

Wherein k is the current time; k+1 is the next time; $v(k)=[v_1(k), \ldots, v_N(k)]^T$, $v_1(k)$ denotes the voltage value of the first distributed generation at t=k, and $v_N(k)$ denotes the voltage value of the N-th distributed generation at t=k; v(k+1) denotes the matrix formed by the voltage values of the distributed generations at t=k+1; $P=I_N(1-\varepsilon)-\varepsilon L$, $I_N$ denotes the n-order unit matrix, and L denotes the Laplacian matrix of the distributed structure of the microgrid, which represents the information exchange between the distributed generations; $E_r = \varepsilon v_{ref} E_N$, $v_{ref}$ denotes the reference voltage value of the microgrid, and $E_N$ denotes the unit column vector of N elements, $E_N = 1N$.

Add a prediction term with an adjustable parameter in the formula (2), as represented by formula (3):

$$v(k+1) = Pv(k) + E_r + u(k)$$

$$u(k) = -\mu[Lv(k) + (v(k) - v_{ref}E_N)] \quad \text{Formula (3)}$$

Wherein u(k) denotes the prediction term with an adjustable parameter, $u(k)=[u_1(k), \ldots, u_N(k)]^T$, $u_1(k)$ denotes the prediction term of the first distributed generation; $u_N(k)$ denotes the prediction term of the N-th distributed generation; the superscript T denotes transposition; and μ denotes the coefficient of the prediction term with an adjustable parameter.

Through the formula (3), the microgrid secondary voltage restoration problem is transformed into a distributed prediction synchronous tracking problem.

According to the formulas (1) and (3), the secondary control compensation term is represented as formula (4):

$$u_i^V(k) = [0, \ldots, 1_{ith}, \ldots, 0][\varepsilon(L-I_N)v(k) + E_r + u(k)] \quad \text{Formula (4)}$$

Wherein $[0, \ldots, 1_{ith}, \ldots, 0]$ represents a row vector comprising N elements, with the i-th element as 1, and the other elements 0;

Step 30) Expand the formula (3) into a trended prediction model comprising $H_P$ prediction horizons and $H_U$ control horizons.

$$V(k+1) = Av(k) + BU(k) + E_r$$

$$U(k) = -FLv(k) + M \quad \text{Formula (5)}$$

Wherein $V(k+1) = [v^T(k+1), \ldots, v^T(k+H_P)]^T$, v(k+1) denotes the matrix formed by the voltage values of the distributed generations at t=k+1, and $v(k+H_P)$ denotes the matrix formed by the voltage values of the distributed generations at t=k+$H_P$; $U(k) = [u^T(k), \ldots, u^T(k+H_u-1)]^T$, u(k) denotes the matrix formed by the first prediction terms of the distributed generations, and $u(k+H_u-1)$ denotes the matrix formed by the $H_u$-th prediction terms of the distributed generations.

$$A = \begin{bmatrix} P \\ \vdots \\ P^{H_P} \end{bmatrix}_{H_U N \times N},$$

$$B = \begin{bmatrix} I_N & & & \\ P & I_N & & \\ \vdots & \vdots & \ddots & \\ P^{H_U-1} & P^{H_U-2} & \ldots & I_N \\ P^{H_U} & P^{H_U-1} & \ldots & P+I_N \\ \vdots & \vdots & & \vdots \\ P^{H_P-1} & P^{H_P-2} & \ldots & P^{H_P-H_U}+\ldots+I_N \end{bmatrix}_{H_P N \times H_U N}$$

$E_r = \bar{E}_r B \in R^{H_P N \times 1}$, R denotes the real number matrix;

$$F = \begin{bmatrix} -\mu(L+I_N) \\ -\mu(L+I_N)(P-\mu(L+I_N)) \\ \vdots \\ -\mu(L+I_N)(P-\mu(L+I_N))^{H_U-1} \end{bmatrix}_{H_U N \times N}$$

$$M = \begin{bmatrix} \mu v_{ref} E_N \\ -\mu(L+I_N)H + \mu v_{ref} E_N \\ \ldots \\ -\mu(L+I_N)(H^{H_u-1}+\ldots+H) + \mu v_{ref} E_N \end{bmatrix}_{H_U N \times 1}$$

$H = E_r + \mu v_{ref} E_N \in R^{N \times 1}$.

Step 40) In order to enable each distributed generation to synchronously track the reference voltage value, suppose that in the $H_P$ prediction horizons, the voltage differences of the distributed generations are represented as formula (7):

$$\Delta V(k+1) = [\Delta v(k+1)^T, \ldots \Delta v(k+H_P)^T]^T \quad \text{Formula (7)}$$
$$= \Psi V(k+1) = \Psi(Av(k) + BU(k) + E_r)$$
$$= A_\Psi v(k) + B_\Psi U(k) + \Psi E_r \in R^{H_P N \times 1}$$

Wherein $\Delta V(k+1)$ denotes the voltage difference matrix of the distributed generations in the time period from k+1 to $k+H_P$; $\Delta v(k+1)$ denotes the voltage difference matrix of the distributed generations at t=k+1; $\Delta v(k+1)=[v_1(k+1)-v_2(k+1), \ldots, v_{N-1}(k+1)-v_N(k+1)]$, $v_1(k+1)$ denotes the voltage difference of the first distributed generation at t=k+1; $v_2(k+1)$ denotes the voltage difference of the second distributed generation at t=k+1; $v_{N-1}(k+1)$ denotes the voltage difference of the (N-1)-th distributed generation at t=k+1; $v_N(k+1)$ denotes the voltage difference of the N-th distributed generation at t=k+1; $\Delta v(k+H_P)$ denotes the voltage difference matrix of the distributed generations at $t=k+H_P$; $\Delta v(k+H_P)=[v_1(k+H_P)-v_2(k+H_P), \ldots, v_{N-1}(k+H_P)-v_N(k+H_P)]$, $v_1(k+H_P)$ denotes the voltage difference of the first distributed generation at $t=k+H_P$; $v_2(k+H_P)$ denotes the voltage difference of the second distributed generation at $t=k+H_P$; $v_{N-1}(k+H_P)$ denotes the voltage difference of the (N-1)-th distributed generation at $t=k+H_P$; $v_N(k+H_P)$ denotes the voltage difference of the N-th distributed generation at $t=k+H_P$; $A_\Psi=\Psi A$, $B_\Psi=\Psi B$, $\Psi=\text{diag}(L, \ldots, L) \in R^{H_P N \times H_P N}$.

According to the formula (7), the coefficient $\mu$ of the prediction term with an adjustable parameter is evaluated to minimize an optimization index function defined by formula (8), where the positive definite symmetric matrices Q, W and R are weight matrices;

$$J(k) = \|\Delta V(k+1)\|_Q^2 + \|V(k+1) - \xi I_{NH_P}\|_W^2 + \|U(k)\|_R^2 \quad \text{Formula (8)}$$

Wherein J(k) denotes the optimization index function; and $\xi$ denotes the reference voltage value of each distributed generation. The penalty function represented as formula (8) comprises three parts: the first part acts as a penalty term of a voltage value deviation between neighboring distributed generations in the $H_P$ prediction horizon; the second part acts as a penalty term of a deviation between each local voltage and the reference value in the $H_P$ prediction horizon; and the third part acts as a penalty term of $H_U$ control energy. The combination of the three ensures the voltage of each distributed generation to quickly and synchronously track the value. On the basis of the evaluated optimal adjustable prediction coefficient, the latest control term is taken as a secondary compensation command, and is implemented on the local controllers.

Substitute the calculated coefficient $\mu$ of the prediction term with an adjustable parameter into the formula (5) to acquire the predictive control term of $H_U$ horizons for each distributed generation, where the current predictive control term is derived as a secondary voltage compensation instruction. Then, the secondary voltage compensation instruction is transmitted to the PWM module of the local controller; and the generated PWM pulse signal is transmitted to the drive and power amplifier unit to trigger the power electronic switching transistor.

In step 40), $Q=qI_N$, $W=wI_N$, $R=rI_N$, q denotes the first coefficient; w denotes the second coefficient; r denotes the third coefficient; q, w and r are all greater than 0. The voltage restoration process can be achieved by adjusting the three coefficients q, w and r.

Step 50) Determine whether the local voltage of each distributed generation of the microgrid reaches the voltage reference value under the secondary voltage compensation item acquired in step 40), if yes, then complete the control process; if no, then re-acquire the local voltage value of each distributed generation as the current voltage value, and repeat steps 20)-40) until the local voltage values all restore to the rated voltage reference value.

In the embodiment above, when the secondary voltage compensation command is acquired in step 30), the latest step is extracted from $H_U$ control horizon each time, and is then applied onto the local controllers, which centrally embodies the concept of real time control and rolling optimization, such that the microgrid operation situations such as load change, topology change and the like can be better adapted. The present invention localizes the calculation and application of the secondary compensation command, and avoids using a central controller, thus satisfying the requirement for microgrid plug and play.

The control scheme is a completely distributed control scheme, obviating the requirement for a supervisory centralized controller. It converts secondary voltage restoration in microgrid into a distributed predictive control based tracker consensus. The application of predictive control and rolling optimization can properly accommodate the model uncertainty, plug and play operation of, Moreover, the approach is robust against the information update rate, thus effectively improving the running level of the microgrid.

Figure 4:
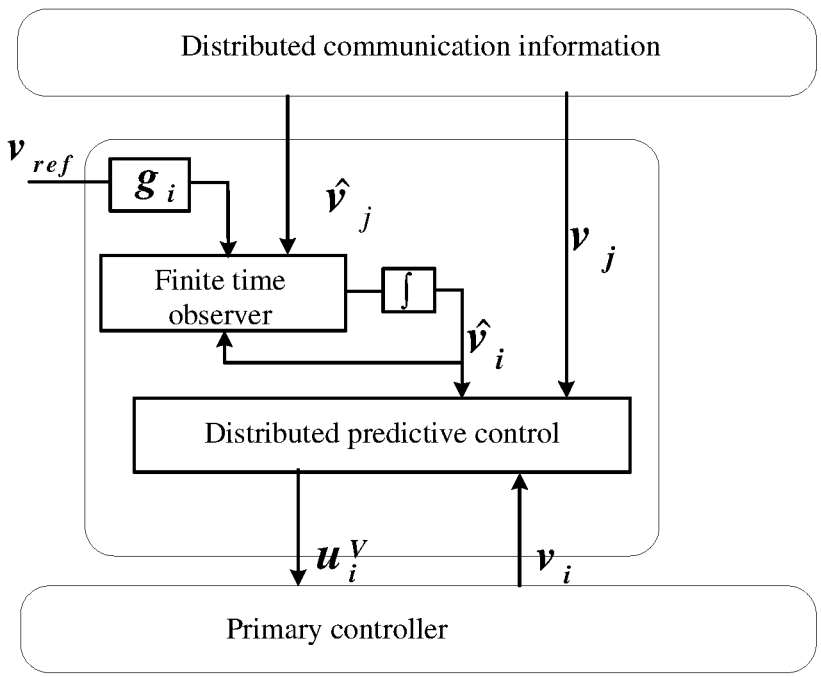
FIG. 4 is a control diagram for the voltage restoration of a microgrid according to the present invention.

As shown in FIG. 4, the control system for the voltage restoration of a microgrid according to the present invention mainly comprises two parts: one part is to acquire the global voltage reference by collecting the voltages of the pinned and the corresponding neighboring distributed generations based on the finite time observer; and the second part is to acquire the secondary compensation items by collecting the voltage of the local and the neighboring primary controllers based on distributed predictive control and thus implement them on the local controllers to restore the microgrid voltage.

Figure 5:
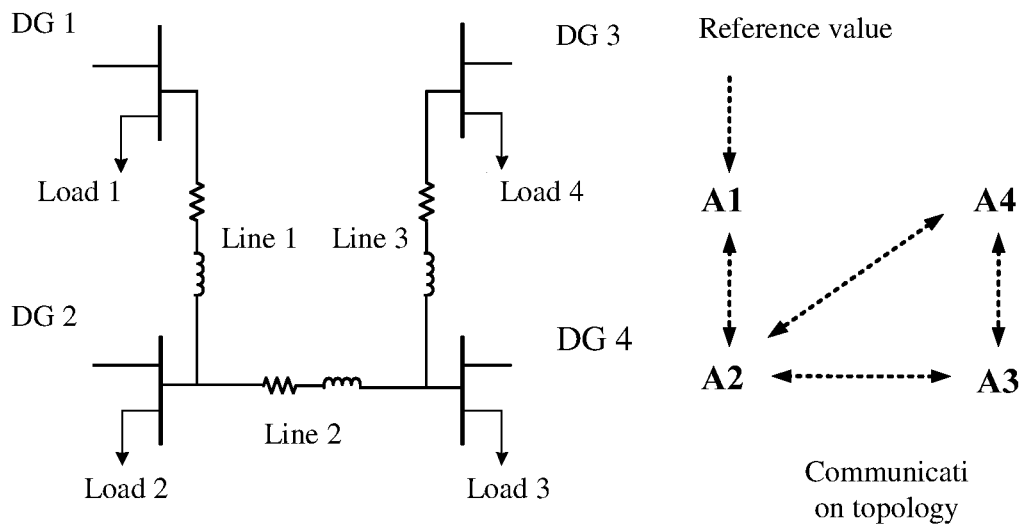
FIG. 5 is a diagram of a communication topology and a simulation microgrid system adopted by the embodiment of the present invention.

An implementation case will be given hereafter:

As shown in FIG. 5, the simulation microgrid system consists of four distributed generations with respective loads and connected end to end via connecting wires. The distributed units are connected to an alternating current bus with reference voltage 0.38 kV via power electronic converters. Four distributed agents exist in the system which are denoted as A1, A2, A3 and A4 respectively; each agent can only communicate with the neighboring agents according to the communication topology; the microgrid model is established on the platform of the power systems computer aided design/electromagnetic transients including DC (PSCAD/EMTDC); the distributed finite time observer and microgrid voltage restoration algorithm based on distributed predictive control are established on the platform of the matrix lab (MATLAB) with a Gurobi 6.02 optimizer and the YAALMIP tool kit; the two simulation platforms are interactively operated via the Fortran language of PCSAD, thus the simulation verification of the present invention is realized utilizing the combined simulation technology. The simulation scenarios of increasing or decreasing loads and detaching distributed generation in microgrid are provided to verify the control methodology effectiveness in the present invention. Furthermore, the results are compared with the conventional voltage restoration method.

Figure 6:
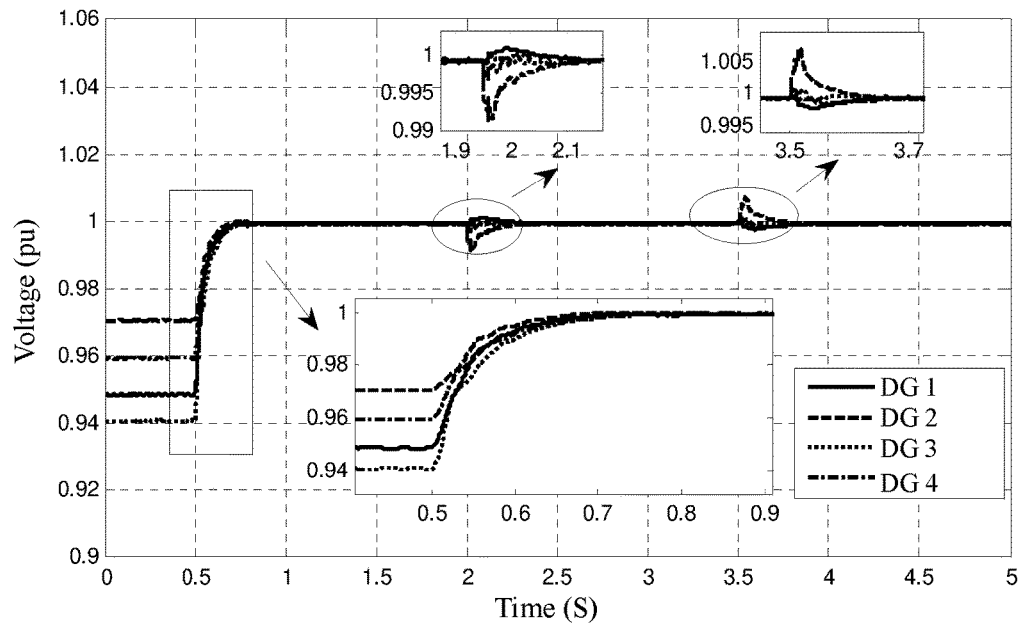
FIG. 6 is the voltage restoration process under the circumstances of load attached to or detached from the microgrid according to the embodiment of the present invention.
Figure 7:
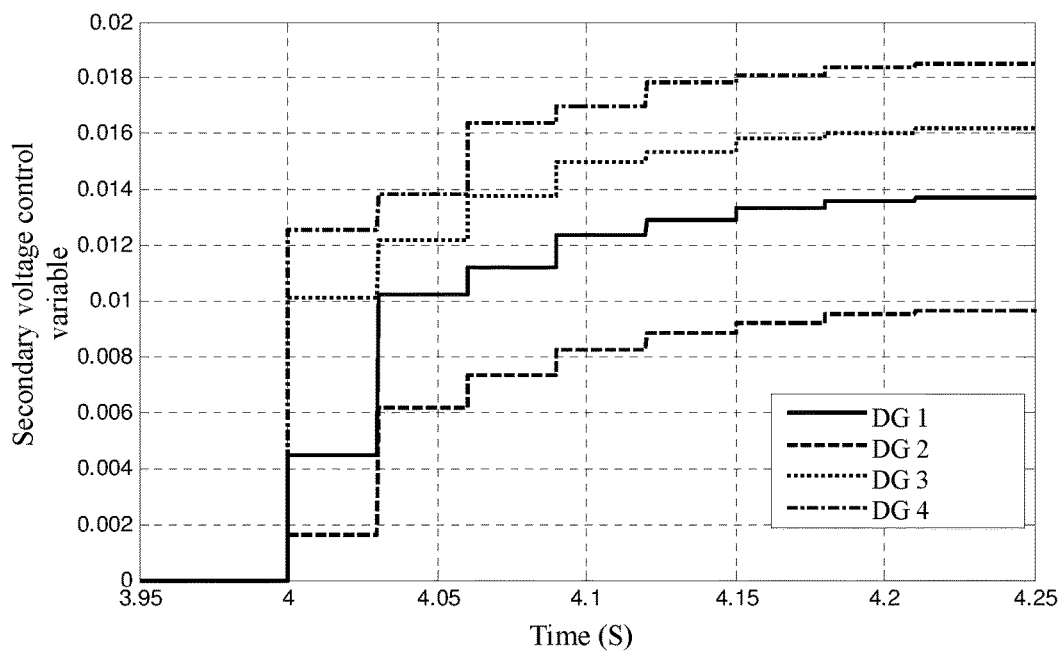
FIG. 7 is a trend diagram of the secondary voltage control input under the circumstances of load attached to or detached from the microgrid according to the embodiment of the present invention.

FIG. 6 and FIG. 7 are the simulation processes under the circumstances of load attached to or detached from the microgrid. At the beginning, the microgrid operates in the primary droop control and thus the voltages of individual distributed generation deviates from the rated value. At t=0.5 s, the distributed voltage restoration scheme of the present invention is put in operation. At t=2 s, an additional load is added to the microgrid, and the voltage descends to a certain extent. At t=3.5 s, the added load is removed. The simulation results are as shown in FIG. 6: the abscissa represents time in the unit of second; and the ordinate represents voltage denoted with per unit. As shown in FIG. 6, after 0.5 s, under the action of the voltage restoration control scheme of the present invention, the secondary voltage compensation command is acquired via distributed predictive control based on the local and neighboring distributed generation units and all the voltage values are synchronously restored to the reference value within 0.3 s, of which the secondary voltage control process is shown in FIG. 7: the abscissa represents time in the unit of second; and the ordinate represents the corresponding voltage compensation variables in the unit of volt. As shown in FIG. 7, due to the difference of the individual voltage values, the trajectories of the compensation control variables are different, which are in a step distribution. At t=2 s, the voltages have a downward trend due to the power shortage. The secondary voltage control of the present invention quickly restores the local voltage to the rated value. Similarly, the voltages have an upward trend at t=3.5 s due to the temporary power surplus. The secondary voltage control of the present invention quickly restores the local voltage to the rated value in 0.2 s.

Figure 8A:
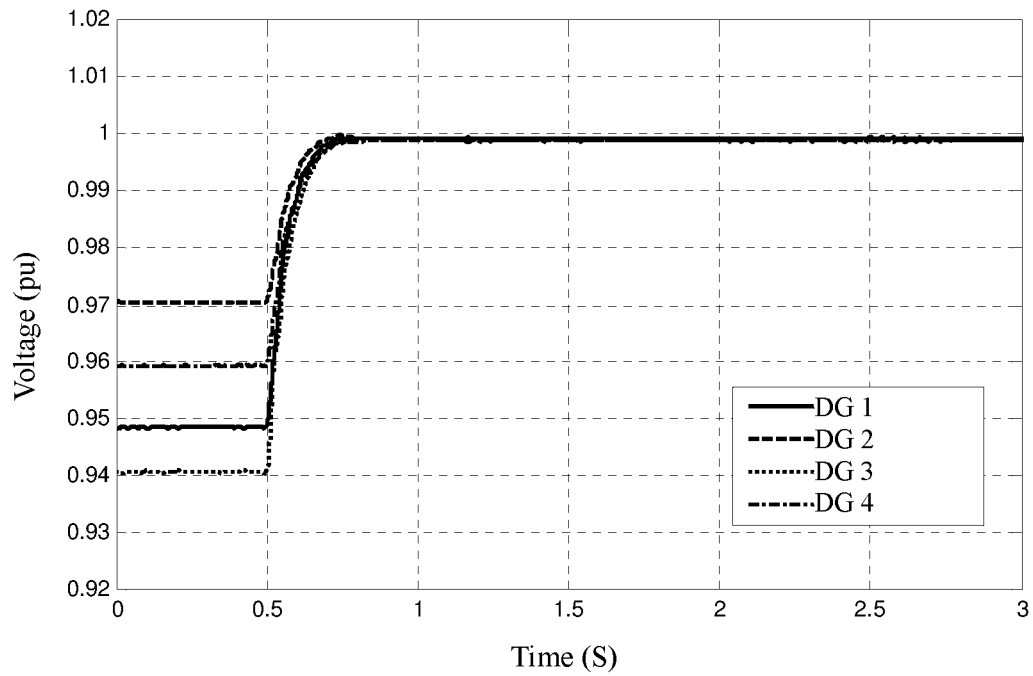
FIG. 8 (a) is a voltage restoration diagram of the present invention under the circumstances of load attached to or detached from the microgrid.
Figure 8B:
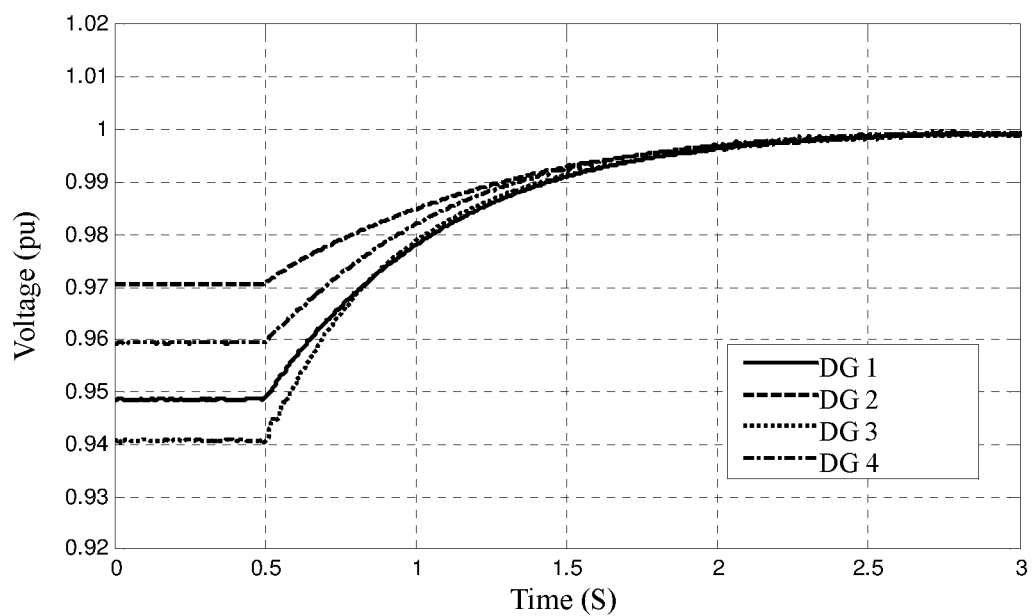

FIG. 8 is a diagram for comparing the simulation results of the voltage restoration scheme including the distributed predictive control described in the present embodiment and the conventional scheme excluding the predictive control, wherein FIG. 8(*a*) is a string diagram of local voltage values of the distributed generations adopting the voltage restoration control scheme of the present invention; and FIG. 8(*b*) is a string diagram of local voltage values of the distributed generations adopting the conventional voltage restoration control scheme. As can be seen from FIG. 8(*a*) and FIG. 8(*b*), compared with the conventional scheme, the scheme of the present invention can restore the voltage to the reference value more quickly, thus improving the dynamic process of the microgrid voltage.

Figure 9:
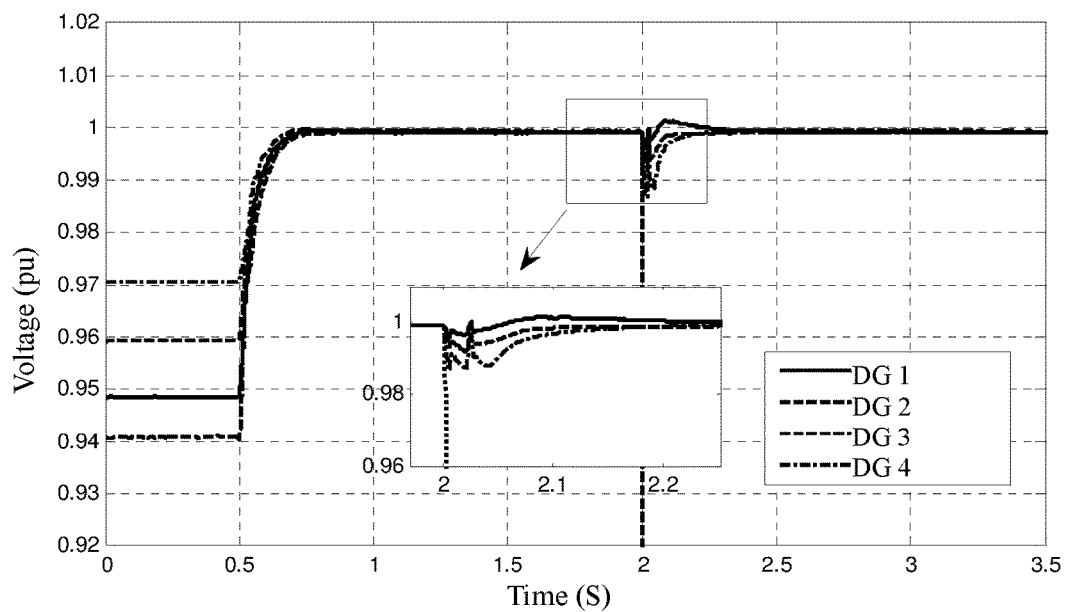
FIG. 9 is the voltage restoration diagram under the circumstance that the distributed generator 3 is detached from microgrid according to the embodiment of the present invention.

FIG. 9 is the voltage restoration diagram under the circumstance that the distributed generator 3 is detached from the microgrid. At the beginning, the microgrid operates in the droop control and the voltages deviate from the rated value. At t=0.5 s, the voltage restoration scheme of the present invention is put into operation; at t=2 s, the distributed generation 3 is detached due to the fault, causing a certain power shortage in the microgrid; then based on the distributed prediction scheme of the present invention, the compensation command is implemented on the local primary controller to maintain the microgrid voltage at the rated voltage level, thus satisfying the plug and play operation form microgrid. In FIG. 9, the abscissa represents time in the unit of second; and the ordinate represents voltage denotes as per unit.

Figure 10A:
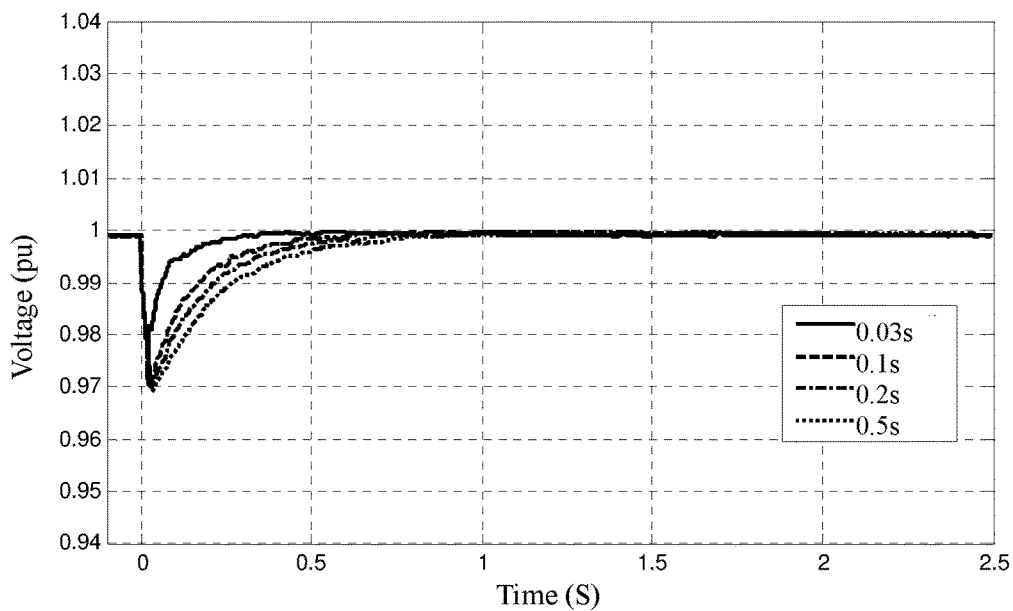
FIG. 10 (a) is the voltage restoration diagram of the present invention at different information updating intervals.
Figure 10B:
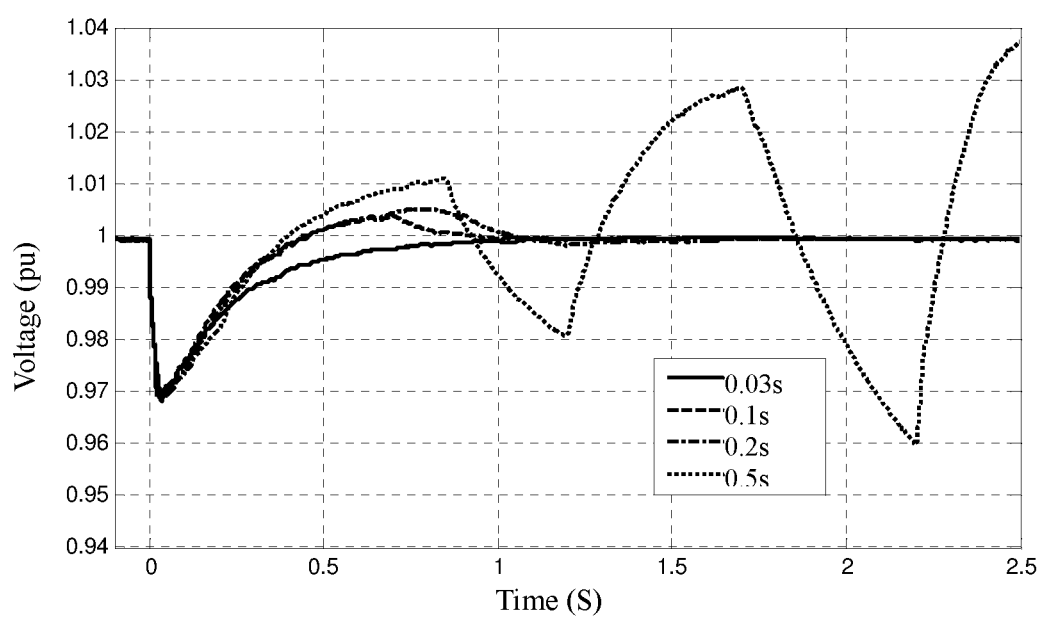

The influence of different data updating intervals on the voltage restoration process is as shown in FIG. 10. In FIG. 10, an additional load is added to the bus of the microgrid at t=s, which results to power shortage and voltage deviation. FIG. 10(*a*) denotes the voltage restoration process curve when adopting the distributed prediction voltage restoration algorithm of the present invention. FIG. 10(*b*) denotes the voltage restoration process curve when adopting the conventional voltage restoration algorithm. It can be seen from FIG. 10(*b*) that, with the increase of the data updating interval, the dynamic effect of the conventional voltage secondary restoration algorithm becomes poor; when the updating interval reaches 0.5 s, growing oscillation occurs to the voltage, and the voltage cannot restore to the rated voltage value. It can be seen from FIG. 10(*a*) that the control scheme of the present invention has a strong robustness to the data updating time, and can quickly restore local voltage to the voltage reference at different data updating intervals, thus ensuring a good dynamic performance.

The scheme for restoring microgrid voltage provided by the present invention transforms the secondary voltage restoration problem into a distributed predictive control based tracker synchronization problem, avoiding the pressure of huge data handling and complex communication mechanism of the central controller, which can efficiently shares the global information and realizes superior dynamic restoration. Because the secondary control command contains prediction information and rolling optimization characteristic, the present invention has a good adaptability to model uncertainty such as the fluctuations of loads and distributed generations and satisfies the requirement for plug and play operation, efficiently improving the dynamic performance of the microgrid.

What is claimed is:
1. A method for restoring a voltage scheme for microgrids based on a distributed predictive control, comprises the following steps:
step 1) acquiring a global reference voltage as reference for restoring local voltage of a distributed generation with a distributed finite time observer, wherein an autonomous microgrid having N distributed generations which utilize distributed control structures, a microgrid voltage reference instruction is entered through a human-machine interface and sent to a part of a pinned distributed generation via 485 communication mode;
step 2) collecting values of voltage from a local sensor with a data acquisition module of each of the distributed generations, and sending the values of voltage to a Digital Signal Processing (DSP); a local controller adopts a droop control, and adding a secondary voltage compensation term to a droop characteristic formula, wherein the local voltage reference value of each of the distributed generations can be represented as formula (1):

$$v_i = v_0 - n_{Qi} + u_i^V \quad \text{formula (1)}$$

wherein $v_i$ denotes the local voltage value of the i-th distributed generation in the microgrid; v0 denotes the voltage reference value (kilovolt); $n_{Qi}$ denotes the voltage droop characteristic coefficient of the i-th distributed generation in the microgrid (kilovolt/megavar); Qi denotes the reactive power of the i-th distributed generation in the microgrid (megavar); and $u^v_i$ denotes the secondary voltage compensation term (kilovolt);

exchanging information with communication ports of the DSP of each of the distributed generations with information update interval ε, according to formula (1), dynamic characteristics of each of the distributed generations is transformed into a discrete form:

$$v(k+1) = Pv(k) + E_r \quad \text{formula (2)}$$

wherein k is the current time; k+1 is the next time; $v(k)=[v_1(k), \ldots, v_N(k)]^T$, $v_1(k)$ denotes the voltage value of first distributed generation at t=k, and $v_N(k)$ denotes the voltage value of the N-th distributed generation at t=k; v(k+1) denotes the matrix formed by the voltage values of the distributed generations at t=k+1; $P=I_N(1-\varepsilon)-\varepsilon L$, $I_N$ denotes the n-order unit matrix, and L denotes the Laplacian matrix of distributed structure of the microgrid, which represents information exchange between the distributed generations; $E_r=\varepsilon V_{ref}E_N$, $V_{ref}$ denotes reference voltage value of the microgrid, and EN denotes the column vector comprising N elements, $E_N=1_N$;

adding a prediction term with an adjustable parameter in the formula (2), as represented by formula (3):

$$v(k+1)=Pv(k)+E_r+u(k)$$

$$u(k)=-\mu[Lv(k)+(v(k)-v_{ref}E_N)] \quad \text{formula (3)}$$

wherein u(k) denotes the prediction term with an adjustable parameter, $u(k)=[u_1(k), \ldots, u_N(k)]^T$, $u_1(k)$ denotes the prediction term of the first distributed generation; $u_N(k)$ denotes the prediction term of the N-th distributed generation; the superscript T denotes transposition; and μ denotes the coefficient of the prediction term with an adjustable parameter;

according to the formulas (1) and (3), the secondary control compensation term is represented as formula (4):

$$u_i^V(k)=[0,\ldots,1_{ith},\ldots 0][\varepsilon(L-I_N)v(k)+E_r+u(k)] \quad \text{formula (4)}$$

wherein $[0, \ldots, 1_{ith}, \ldots, 0]$ represents a row vector comprising N elements, with the i-th element as 1, and the other elements 0;

step 3) Expand the formula (3) into a trended prediction model comprising $H_P$ prediction horizons and $H_U$ control horizons;

$$V(k+1)=Av(k)+BU(k)+E_r$$

$$U(k)=-FLv(k)+M \quad \text{formula (5)}$$

wherein $V(k+1)=[v^T(k+1), \ldots, v^T(k+H_P)]^T$, v(k+1) denotes the matrix formed by the voltage values of the distributed generations at t=k+1, and $v(k+H_P)$ denotes the matrix formed by the voltage values of the distributed generations at t=k+$H_P$; $U(k)=[u^T(k), \ldots, u^T(k+H_u-1)]^T$, u(k) denotes the matrix formed by the first prediction terms of the distributed generations, and $u(k+H_u-1)$ denotes the matrix formed by the $H_u$—the prediction terms of the distributed generations;

$$A = \begin{bmatrix} P \\ \vdots \\ P^{H_P} \end{bmatrix}_{H_U N \times N}, \quad \text{formula (6)}$$

$$B = \begin{bmatrix} I_N & & & & \\ P & I_N & & & \\ \vdots & \vdots & \ddots & & \\ P^{H_U-1} & P^{H_U-2} & \ldots & I_N & \\ P^{H_U} & P^{H_U-1} & \ldots & P+I_N & \\ \vdots & \vdots & \vdots & & \vdots \\ P^{H_P-1} & P^{H_P-2} & \ldots & P^{H_P-H_U}+\ldots+I_N & \end{bmatrix}_{H_P N \times H_U N}$$

$E_r=E_r B \in R^{H_P N \times 1}$, R denotes the real number matrix;

$$F = \begin{bmatrix} -\mu(L+I_N) \\ -\mu(L+I_N)(P-\mu(L+I_N)) \\ \vdots \\ -\mu(L+I_N)(P-\mu(L+I_N))^{H_U-1} \end{bmatrix}_{H_U N \times N}$$

$$M = \begin{bmatrix} \mu v_{ref} E_N \\ -\mu(L+I_N)H + \mu v_{ref} E_N \\ \ldots \\ -\mu(L+I_N)(H^{H_u-1}+\ldots+H) + \mu v_{ref} E_N \end{bmatrix}_{H_U N \times 1}$$

$H = E_r + \mu v_{ref} E_N \in R^{N \times 1}$;

step 4) setting $H_P$ prediction horizons, voltage differences of the distributed generations are represented as formula (7):

$$\Delta V(k+1) = [\Delta v(k+1)^T, \ldots \Delta v(k+H_P)^T]^T \quad \text{Formula (7)}$$
$$= \Psi V(k+1) = \Psi(Av(k)+BU(k)+E_r)$$
$$= A_\Psi v(k) + B_\Psi U(k) + \Psi E_r \in R^{H_P N \times 1}$$

wherein ΔV(k+1) denotes the voltage difference matrix of the distributed generations in the time period from k+1 to k+$H_P$; Δv(k+1) denotes the voltage difference matrix of the distributed generations at t=k+1; $\Delta v(k+1)=[v_1(k+1)-v_2(k+1), \ldots, v_{N-1}(k+1)-v^N(k+1)]$, $v_1(k+1)$ denotes the voltage difference of the first distributed generation at t=k+1; $v_2(k+1)$ denotes the voltage difference of the second distributed generation at t=k+1; $v_{N-1}(k+1)$ denotes the voltage difference of the (N−1)-th distributed generation at t=k+1; $v_N(k+1)$ denotes the voltage difference of the N-th distributed generation at t=k+1; $\Delta v(k+H_P)$ denotes the voltage difference matrix of the distributed generations at t=k+$H_P$; $\Delta v(k+H_P)=[v_1(k+H_P)-v_2(k+H_P), \ldots, v_{N-1}(k+H_P)-v_N(k+H_P)]$, $v_1(k+H_P)$ denotes the voltage difference of the first distributed generation at t=k+$H_P$; $v_2(k+H_P)$ denotes the voltage difference of the second distributed generation at t=k+$H_P$; $v_{N-1}(k+H_P)$ denotes the voltage difference of the (N−1)-th distributed generation at t=k+$H_P$; $v_N(k+H_P)$ denotes the voltage difference of the N-th distributed generation at t=k+$H_P$; $A_\Psi=\Psi A$, $B_\Psi=\Psi B$, $\Psi=\text{diag}(L, \ldots, L) \in^{H_P N \times H_P N}$ according to the formula (7), the coefficient μ of the prediction term with an adjustable parameters evaluated to minimize an optimization index function defined by formula (8) in the DSP, where the positive definite symmetric matrices Q, W and R are weight matrices;

$$J(k)=\|\Delta V(k+1)\|_Q^2+\|V(k+1)-\xi I_{NHp}\|_w^2+\|U(k)\|_R^2 \quad \text{formula (8)}$$

wherein $J(k)$ denotes the optimization index function; and $\xi$ denotes the reference voltage value of each of the distributed generations;

substitute the calculated coefficient $\mu$ of the prediction term with an adjustable parameter into the formula (5) to acquire the predictive control term of $H_U$ horizons for each of the distributed generations, where the current predictive control term is derived as a secondary voltage compensation instruction; then, the secondary voltage compensation instruction is transmitted to a PWM module of the local controller; and a generated PWM pulse signal is transmitted to a drive and power amplifier unit to trigger a power electronic switching transistor;

step 5) determining whether the local voltage of each of the distributed generations in the microgrid reaches the voltage reference value under a secondary voltage compensation item acquired in step 4), if yes, then complete the control process; if no, then re-acquire the local voltage value of each of the distributed generations as the current voltage value, and repeat step 2), step 3) and step 4) until the local voltage values all restore to the voltage reference value.

2. The method according to claim 1, wherein the distributed finite time observer is represented as formula (9) in step 1):

$$\hat{\dot{v}}_i = sig\left[\sum_{j=1}^{N} a_{ij}(\hat{v}_j - \hat{v}_i) + g_i(v_{ref} - \hat{v}_i)\right]^{1/2} \quad \text{Formula (9)}$$

wherein $\hat{v}_i$ denotes the output value of a local observer of the i-th distributed generation, and represents the observation to the global reference information; $\hat{\dot{v}}_i$ denotes the differential form of $\hat{v}_i$; $a_{ij}$ denotes the neighboring weight; $a_{ij}>0$ denotes that the i-th distributed generation is directly connected to the j-th distributed generation; $a_{ij}=0$ denotes that the i-th distributed generation is not connected to the j-th distributed generation; $\hat{v}_j$ denotes the output value of the local observer of the j-th distributed generation;

$g_i$ denotes if the i-th distributed generation is a pinned generation, $g_i=1$ denotes that the ith distributed generation is a pinned distributed generation and can directly acquire the reference value, $g_i=0$ denotes that the ith pinned distributed generation is not a pinned distributed generation and fails to acquire the reference value.

3. The method according to claim 1, wherein $Q=qI_N$, $W=wI_N$, $R=rI_N$, q denotes the first coefficient in step 4); w denotes the second coefficient; r denotes the third coefficient; q, w and r are all greater than 0.

* * * * *